US011299289B1

(12) United States Patent
Derstein et al.

(10) Patent No.: US 11,299,289 B1
(45) Date of Patent: Apr. 12, 2022

(54) ANGLE-OF-ATTACK DETERMINATION FOR AIRCRAFT STALL PROTECTION

(71) Applicant: Textron Aviation Inc., Wichita, KS (US)

(72) Inventors: Brian Anthony Derstein, Wichita, KS (US); Steven G. Hagerott, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 359 days.

(21) Appl. No.: 16/431,375

(22) Filed: Jun. 4, 2019

Related U.S. Application Data

(60) Provisional application No. 62/680,709, filed on Jun. 5, 2018.

(51) Int. Cl.
*B64D 43/02* (2006.01)
*G05D 1/06* (2006.01)
*G05D 1/08* (2006.01)

(52) U.S. Cl.
CPC .......... *B64D 43/02* (2013.01); *G05D 1/0607* (2013.01); *G05D 1/0816* (2013.01)

(58) Field of Classification Search
CPC .......... B64C 2201/146; B64C 201/042; B64C 15/02; B64C 39/024; B64C 2201/10;
(Continued)

(56) References Cited

U.S. PATENT DOCUMENTS 4,676,460 A * 6/1987 Hagy .................... G05D 1/0607 244/178
6,273,370 B1 * 8/2001 Colgren ................. G01C 21/16 244/181

(Continued)

FOREIGN PATENT DOCUMENTS

EP 1196831 B1 * 10/2003 .......... G05D 1/0816

OTHER PUBLICATIONS

Marie-Michele Siu et al, "Flight Test Results of an Angle of Attack and Angle of Sideslip Calibration Method Using Output-Error Optimization", AAIA, Atmospheric Flight Mechanics (AFM) Conference, Aug. 19-22, 2013 (Year: 2013).*

*Primary Examiner* — Abby Y Lin
*Assistant Examiner* — Hossam M Abd El Latif
(74) *Attorney, Agent, or Firm* — Erise IP, P.A.

(57) ABSTRACT

A method for determining an aircraft angle-of-attack for aircraft stall protection includes providing an output signal from an angle-of-attack sensor and determining an initial angle-of-attack signal based on the output signal. The initial angle-of-attack signal is compensated to provide a pseudo angle-of-attack signal, and the pseudo angle-of-attack signal is mapped to a true angle-of-attack signal based on flight test data. The true angle-of-attack signal is compensated based on roll rate and sideslip or estimated sideslip to provide a compensated angle-of-attack. A complementary filter is applied that complements the compensated angle-of-attack signal with a higher frequency inertial angle-of-attack rate signal, calculated from aircraft inertial data, to provide an angle-of-attack complementary filter output. An angle-of-attack threshold for aircraft stall protection is determined based on one or more compensation parameters. Activation of aircraft stall protection is determined based on the angle-of-attack complementary filter output compared with the angle-of-attack threshold.

17 Claims, 2 Drawing Sheets

(58) Field of Classification Search
CPC ... B64C 2201/108; B64C 27/08; B64C 27/20; B64C 39/001; B64C 13/16; B64C 19/00; B64C 2201/027; B64C 2203/00; B64C 13/18; B64C 5/02; B64D 5/00; B64D 1/18; B64D 27/14; B64D 43/02; B64F 5/60; G05D 1/0607; G05D 1/0816; G08G 5/0013; G08G 5/0034; G08G 5/003; G08G 5/025; G08G 5/0043; G01P 13/025
USPC .......................................................... 701/8
See application file for complete search history.

(56) References Cited

U.S. PATENT DOCUMENTS

| | | | |
|---|---|---|---|
| 2015/0175270 A1* | 6/2015 | Tiseo | G01L 1/14 701/14 |
| 2017/0060141 A1* | 3/2017 | Leopold | G05D 1/0825 |
| 2019/0127079 A1* | 5/2019 | Ribeiro | B64D 45/00 |
| 2019/0202546 A1* | 7/2019 | Mahboubi | G05D 1/0858 |

* cited by examiner

ANGLE-OF-ATTACK DETERMINATION FOR AIRCRAFT STALL PROTECTION

CROSS-REFERENCE TO RELATED APPLICATIONS

This application claims the benefit of U.S. Provisional Application No. 62/680,709 entitled "Angle-of-Attack Determination for Aircraft Stall Protection" and filed on Jun. 5, 2018, which is herein incorporated by reference in its entirety.

BACKGROUND

1. Field

Embodiments of this disclosure relate generally to aircraft flight information and more specifically to accurate determination of aircraft angle-of-attack.

2. Description of the Related Art

Devices used to determine aircraft angle-of-attack typically include angle-of-attack vanes or differential pressure probes.

SUMMARY

In an embodiment, an aircraft angle-of-attack determining method is provided. The method includes providing an output signal from an angle-of-attack sensor to a controller. The following steps are performed by the controller: determining an initial angle-of-attack signal based on the output signal, compensating the initial angle-of-attack signal to provide a pseudo angle-of-attack signal, mapping the pseudo angle-of-attack signal to a true angle-of-attack signal based on flight test data, compensating the true angle-of-attack signal based on roll rate and sideslip or estimated sideslip to provide a compensated angle-of-attack, and applying a complementary filter that passes the compensated angle-of-attack signal through a low-pass filter and complements it with higher frequency inertial angle-of-attack rate signal calculated from aircraft inertial data to provide an angle-of-attack complementary filter output.

In another embodiment, a method for determining an aircraft angle-of-attack for aircraft stall protection is provided. The method includes providing an output signal from an angle-of-attack sensor to a controller; determining, via the controller, an initial angle-of-attack signal based on the output signal; compensating, via the controller, the initial angle-of-attack signal to provide a pseudo angle-of-attack signal based on dynamic pressure; mapping, via the controller, the pseudo angle-of-attack signal to a true angle-of-attack signal based on flight test data from a calibrated wing-tip-mounted angle-of-attack boom; compensating, via the controller, the true angle-of-attack signal based on roll rate and sideslip or estimated sideslip to provide a compensated angle-of-attack; applying a complementary filter, via the controller, that passes the compensated angle-of-attack signal through a low-pass filter and complements it with higher frequency inertial angle-of-attack rate signal calculated from aircraft inertial data to provide an angle-of-attack complementary filter output; and determining, via the controller, an angle-of-attack threshold for aircraft stall protection based on one or more parameters; and activating aircraft stall protection based on the complementary filter output compared with the angle-of-attack threshold.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
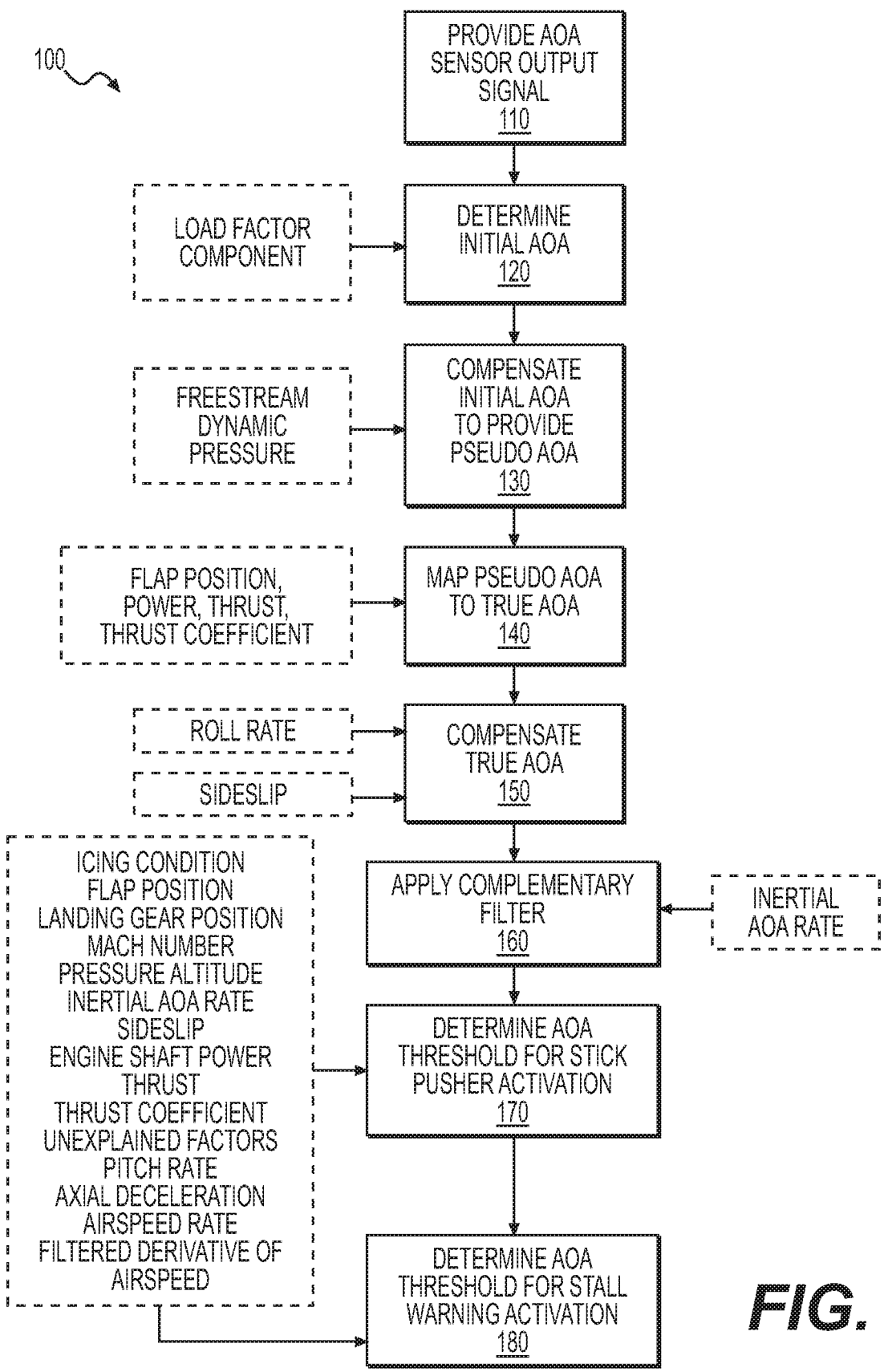
FIG. 1 shows steps of a method for determining an accurate estimation of angle-of-attack for stall protection, in an embodiment.

The angle-of-attack (AOA) of an aircraft is generally represented by an angle between a plane of a wing and the predominate air flow with respect to the wing. As the AOA increases, the lift of the aircraft also increases, up to a maximum angle (e.g., the critical AOA) at which point the aircraft begins to stall. Providing an accurate AOA is important for avoiding the critical AOA without requiring a large margin that affects aircraft performance. It is also critical that the system compensates for abused stall entry conditions (e.g., uncoordinated (non-zero sideslip) or accelerated (rate of speed reduction between 3 and 5 knots per second) stall entries) to ensure that the system provides robust stall protection under all conceived conditions without performance penalizing margins for normal operations.

Embodiments of the present disclosure provide a method for determining an accurate aircraft AOA based on a measured input signal that is adapted to provide advantages for stall protection. Embodiments of the present disclosure also provide accurate AOA feedback which has advantages for closed-loop "fly-by-wire" systems including stability augmentation and envelope protection.

As used herein, the term "stall protection" includes both a stall warning and a stick pusher function. A stall warning alerts a pilot/co-pilot when the aircraft is approaching an aerodynamic stall (e.g., by shaking a control stick of the pilot/co-pilot with a stick shaker). A stick pusher is a hydraulic or electro-mechanical device that pushes the control stick forward to adjust the elevator position to lower the AOA of the aircraft, thereby avoiding a stall. The stick pusher may be actuated by an autopilot servo, for example. Activation of stick pusher and stick shaker functions may be based on different threshold AOA angles. The AOA threshold angles may be adjusted based on a variety of parameters, as further described below in connection with FIG. 1.

Measurements used to determine an aircraft AOA may be provided by a variety of sensors. For example, an electromechanical device includes a mechanical component (e.g., a spring-mounted tab) or elastomeric material that deflects or deforms under a load (e.g., caused by air flow) and produces a corresponding output signal based on a deflection or deformation of the mechanical/elastomeric component. An exemplary electromechanical device is a lift transducer. The electromechanical device is located onboard the aircraft such that when the AOA increases/decreases, the force imposed on the mechanical/elastomeric component by the air flow increases/decreases, which deflects/deforms the mechanical/elastomeric component, thereby causing a corresponding output signal change. In certain embodiments, the electromechanical device may be replaced with sensors that output a signal based on a force applied to the mechanical/elastomeric component by the air flow (e.g., a strain gauge). Alternatively, a stagnation point location may be determined by measuring pressures on the lifting surfaces of the airframe via a distribution of pressure ports on the lifting surfaces.

Embodiments of the present disclosure provide a method to compensate an AOA sensor output for the effects of airspeed, normal acceleration, roll rate, and sideslip, thrust, shaft horsepower, among other things. The method uses nonlinear translation from sensor output to provide a pseudo AOA and maps the resulting pseudo AOA to the true aircraft AOA based on flight test data. The true aircraft AOA signal is passed through a complementary filter to remove higher frequency effects of wind gusts and turbulence that are naturally damped out by aircraft inertia, without adding a time delay. The method may be used with many existing aircraft systems, including but not limited to automatic aircraft stability augmentation systems, aircraft stall protection systems, aircraft low-speed awareness systems, Unmanned Aerial Vehicles (UAV's), and aircraft closed loop "fly-by-wire" flight control systems. Advantages of the method include increased accuracy of AOA which increases stall protection accuracy and flight-control system performance.

FIG. 1 shows steps of an exemplary method 100 for determining an accurate estimation of AOA for stall protection. Method 100 is especially applicable for use with low-airspeed aircraft such as propeller-driven aircraft. The propeller slipstream of propeller-driven aircraft prevents the use of more typical AOA vanes that are mounted to the aircraft fuselage. Instead, the AOA sensors described above (e.g., lift transducer) are used.

In certain embodiments, a minimum airspeed cutoff is established to avoid singularities caused by dividing by zero in the data processing and scheduling implementation and inaccurate AOA sensor output. When airspeed is below the minimum cutoff, stall warning and stick pusher activation is inactivated.

In a step 110, an output signal from an AOA sensor is provided. In an example of step 110, the output signal from an AOA sensor mounted to a wing leading edge is received by a controller. The controller is for example a flight control computer that includes one or more of a computer, a microcontroller, a microprocessor, or a programmable logic controller (PLC). In certain embodiments, the controller includes a memory, including a non-transitory medium for storing software, and a processor for executing instructions of software. The memory may be used to store information used by the controller, including but not limited to algorithms, lookup tables, and computational models. In some embodiments, the controller serves as a Stall Warning and Protection System (SWPS).

In a step 120, an initial AOA is determined. In an example of step 120, the output signal from the AOA sensor is converted by the controller into an initial AOA signal. In certain embodiments, a load factor ($N_Z$) is determined to provide a measurable contribution to the raw AOA sensor measurement while maneuvering. For example, a lift transducer force may be compensated for the effects of load factor by applying a gain determined through flight test. A load factor component ($n_z$) is a component of the load factor along a body-fixed z-axis (e.g., zero in level unaccelerated flight). In some embodiments, the controller may pass the load factor component through a low pass filter with a configurable break frequency.

Any gain applied in the embodiments disclosed herein may include a proportional gain, a derivative gain, or an integral gain, or any additive combination of proportional, derivative, and integral gains, without departing from the scope hereof.

In a step 130, the initial AOA is compensated to provide a "pseudo AOA". In an example of step 130, the controller compensates for effects of dynamic pressure to provide a pseudo AOA signal based on a freestream dynamic pressure. The freestream dynamic pressure may be determined by the controller via a lookup table based on a measured impact pressure (e.g., using pitot tubes). A gain may be applied for modifying the pseudo AOA based on flight testing.

In a step 140, the pseudo AOA is mapped to a "true AOA". In an example of step 140, the controller maps the pseudo AOA signal to a true AOA signal based on flight test data from a calibrated wing-tip-mounted angle-of-attack boom. Based on the measured flight test data, the controller maps the pseudo AOA to the true AOA (e.g., in degrees). The mapping is performed to remove nonlinear behavior of the pseudo AOA with respect to the true AOA. The AOA mapping may be implemented by the controller via a lookup table or a polynomial curve fit, for example. In certain embodiments, the AOA mapping depends upon flap position and/or engine thrust. Scheduling a stall warning and a stick pusher activation based on the true AOA ensures consistent margins for stall warning and stick pusher activation.

In a step 150, the true AOA is compensated. In an example of step 150, the true AOA signal is compensated for one or both of aircraft roll rate and sideslip to provide a compensated AOA signal.

In certain embodiments, the true AOA is compensated for a change in a local AOA at the AOA sensor due to aircraft roll rate. An AOA offset is determined via the controller to remove any differences between two AOA sensors located on opposing wings due to roll rate. In other words, a local change in AOA may occur at a given AOA sensor due to its distance from an aircraft centerline. In some embodiments, the true AOA is compensated for a change in a local AOA at the sensor due to one or more of sideslip, estimated sideslip, or lateral load factor. In other words, a local change in AOA may occur at a given AOA sensor due to wing dihedral. Step 150 may also include corrections for AOA sensor differences due to asymmetric flow effects caused by thrust and shaft horsepower.

Figure 2:
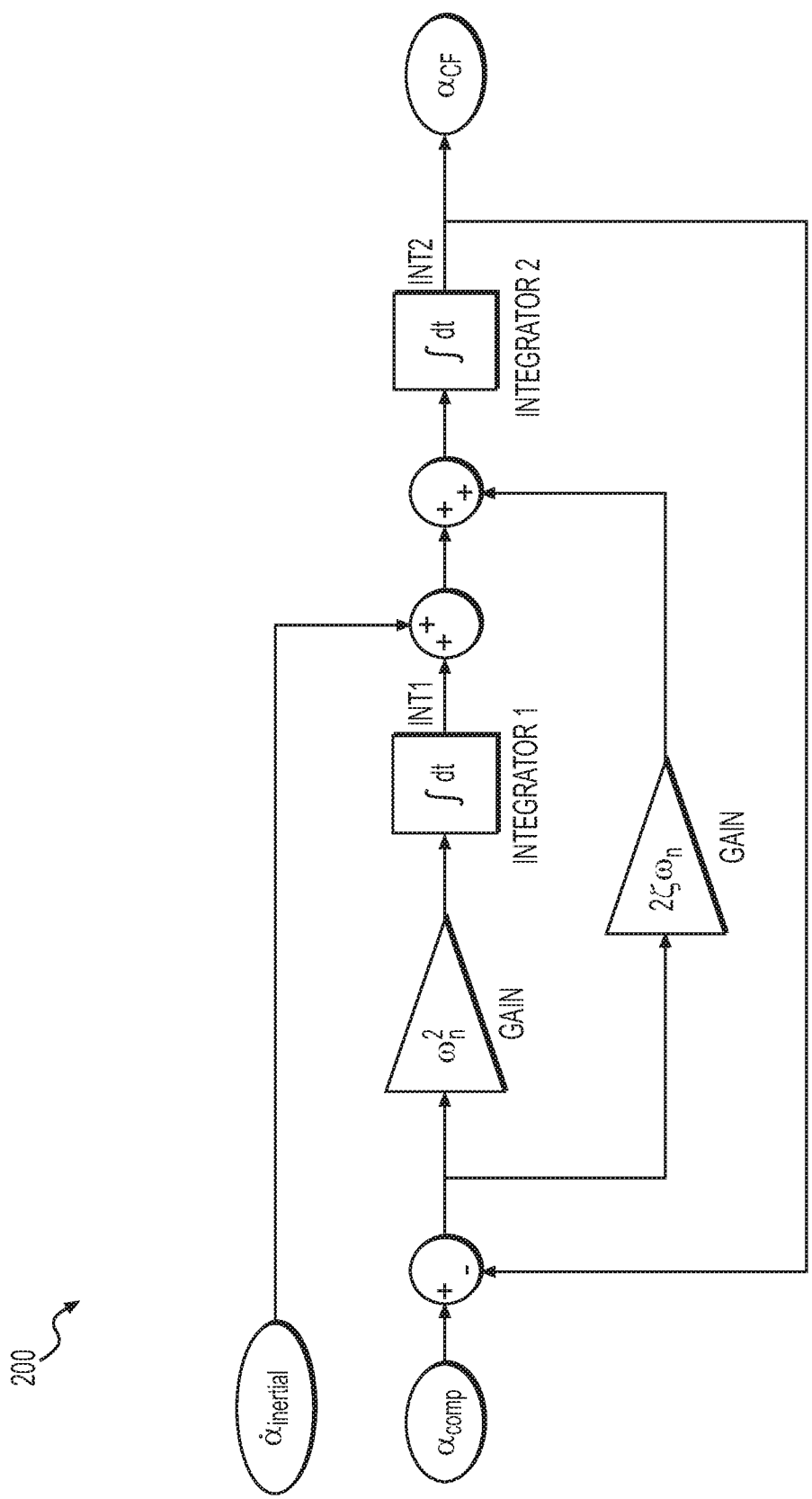
FIG. 2. is a block diagram of a complementary filter used in the method of FIG. 1, in an embodiment.

In a step 160, a complementary filter is applied. In an example of step 160, the compensated AOA, $\alpha_{comp}$, and the inertial AOA rate ($\dot{\alpha}_{inertial}$), are passed through a complementary filter as depicted in FIG. 2, without adding a time delay, to remove higher frequency effects of wind gusts and turbulence that are naturally damped out by aircraft inertia. Alternatively, a filtered derivative on pitch rate could be used instead of the inertial AOA rate.

FIG. 2 shows a block diagram of an exemplary complementary filter 200 used in step 160. The complementary filter 200 passes the compensated AOA ($\alpha_{comp}$), based on the AOA sensor measurement, through a low-pass filter and complements it with higher frequency AOA data using inertial AOA rate ($\dot{\alpha}_{inertial}$) calculated from aircraft inertial data to provide an AOA complementary filter output, $\alpha_{CF}$. The complementary filter 200 complements (e.g., fuses) integrated inertial AOA rate (e.g., estimated) with filtered-measured AOA data (e.g., translated data provided by the AOA sensor). In certain embodiments, limiters are applied to both Integrator 1 and Integrator 2. In some embodiments, modifications to input signals (e.g., gains, time delays, etc.) are added to compensate for different update rates between the two filter input sources. By fusing data from these two sources, the AOA data is filtered without adding latency to the signal, which would affect the stall warning and/or stick pusher performance.

Other complementary filter forms may be used, such as $3^{rd}$ order for example. Additionally, a Kalman filter may be employed to achieve similar results with the available data being used as the complementary filter.

Returning to FIG. 1, in a step 170 an AOA threshold is determined for scheduling stick pusher activation. In an example of step 170, a first AOA threshold is determined for stick pusher activation by the controller based on a nominal AOA plus any adjustments. The nominal AOA is for example the stick pusher activation AOA based on nominal flight conditions (e.g., flaps retracted, landing gear retracted, zero sideslip, non-icing condition). Adjustments may be made for one or more of the following scheduling/compensation parameters: icing condition, flap position, landing gear position, Mach number, pressure altitude, inertial AOA rate, sideslip, engine shaft power, engine shaft torque, thrust, and thrust coefficient, as well as any flight-test discovered dependencies or unexplained factors. Descriptions of how these adjustments are determined are provided below.

In a step 180, an AOA threshold is determined for scheduling a stall warning activation. In an example of step 180, a second AOA threshold is determined for stall warning activation by the controller based on the stick pusher AOA threshold plus an additional adjustment. In other words, the stall warning AOA threshold is determined in the same manner as in step 170 plus an additional (and optional) adjustment for stall warning, as described below. Therefore, all of the adjustments for various parameters described below affect both the stall warning AOA threshold and the stick pusher AOA threshold.

An adjustment to the stick pusher AOA threshold for icing condition may be made to advance activation of the stick pusher function and stall warning to protect from aerodynamic stall in icing condition. Values for these adjustments may be determined, at least partially, via flight testing. The adjustments may be based on flap position and may account for more than one icing mode (e.g., a normal de-icing mode and a failed de-icing mode).

An adjustment to the stick pusher AOA threshold for flap position may include an offset to the stick pusher and stall warning schedules based on flap position (e.g., 0, 15, 30, and 40 degrees). In certain embodiments, a data signal indicative of flap position is passed through a first order low-pass filter with a one second time constant. In some embodiments, the controller interpolates the data signal between flap positions with a ±2-degree flat at each nominal flap position. The values associated with nominal flap position and a width of the flat around each nominal flap position may be varied based on flight-test information.

An adjustment to the stick pusher AOA threshold for landing gear position may include an offset to the stick pusher and stall warning schedules based on landing gear position. For example, the stick pusher may be scheduled to provide a five-knot minimum stick pusher margin with landing gear in the up position and a two-knot margin with landing gear in the down position to avoid an effect on field performance (e.g., when stall characteristics are hazardous with the landing gear up and non-hazardous with the landing gear down).

An adjustment to the stick pusher AOA and stall warning AOA thresholds for Mach number may include an offset to compensate for any compressibility effects on wing stall, buffet, or AOA sensor measurement up to a predetermined maneuver speed (e.g., up to Mach 0.47). For example, a gain may be applied to the adjustment for Mach number based on flight test data, including a nonlinear scheduling capability, by interpolating a lookup table based on Mach.

An adjustment to the stick pusher AOA and stall warning AOA thresholds for pressure altitude may be offset for accommodating atypical operating limitations, if necessary. For example, a gain may be applied to the adjustment for pressure altitude based on flight test data, including a nonlinear scheduling capability, by interpolating a lookup table based on altitude.

An adjustment to the stick pusher AOA and stall warning AOA thresholds for an inertial AOA rate ($\dot{\alpha}_{inertial}$) may include an offset used for stall anticipation during accelerated stall entries. For example, a gain may be applied to the adjustment for inertial AOA rate including a nonlinear scheduling capability on AOA rate as a function of Mach number by interpolating from a lookup table. In certain embodiments, an AOA rate signal is passed through a lead/lag filter to remove frequencies that correspond to structural natural frequencies of the aircraft. Alternatively, accelerated stall entries may be indicated by pitch rate, filtered derivative pitch rate, longitudinal acceleration (e.g., $N_x$), or filtered derivative airspeed.

An adjustment to the stick pusher AOA and stall warning AOA thresholds for sideslip may include an offset to advance stick pusher activation and stall warning to protect against advanced wing stall induced by sideslip. For example, a gain may be applied to the threshold for sideslip that is determined through flight test and may be a function of shaft horsepower (SHP), thrust, or thrust-coefficient due to the large variation of side force coefficient due to sideslip ($C_{y\beta}$) with power. Thrust coefficient, in an embodiment, is a non-dimensional parameter of thrust normalized as a function of freestream dynamic pressure and aircraft reference wing area. However, other definitions of thrust coefficient may be used without departing from the scope hereof. In certain embodiments, the controller provides capability to schedule with a lateral load factor divided by freestream dynamic pressure by interpolating a lookup table, which may include asymmetric values for left and right sideslip due to propeller effects.

An adjustment to the stick pusher AOA threshold and stall warning AOA threshold for engine shaft power or engine shaft torque may include an offset to compensate for thrust and propeller slipstream effects on characteristics of aircraft stall. For example, a gain determined through flight test may be applied to the adjustment for engine shaft power/torque to provide nonlinear scheduling capability with SHP or shaft torque by interpolating a lookup table.

An adjustment to the stick pusher AOA threshold and stall warning AOA threshold for thrust may include an offset to compensate for thrust and propeller slipstream effects on the aircraft stall characteristics. For example, a gain determined through flight test may be applied to the adjustment for thrust to provide nonlinear scheduling capability with SHP/TAS by interpolating a lookup table, where TAS stands for true airspeed.

An adjustment to the stick pusher AOA threshold and stall warning AOA threshold for thrust coefficient may include an offset to compensate for thrust and propeller slipstream effects on aircraft stall characteristics. For example, a gain determined through flight test may be applied to the adjustment for thrust coefficient to provide nonlinear scheduling capability with $$\frac{SHP}{TAS \cdot CAS^2}$$

by interpolating a lookup table, where CAS stands for calibrated airspeed.

An adjustment to the stick pusher AOA threshold and stall warning AOA threshold for a flight-test discovered dependency may include a computed correction to compensate for unknown effects on AOA that may be encountered during flight test development. For example, a gain determined through flight test may be applied to an "unknown" adjustment to provide nonlinear scheduling capability by interpolating a lookup table.

In certain embodiments, the following scheduling/compensation parameters are a function of flap position: icing, landing gear position, AOA rate, pitch rate, engine shaft power/torque, thrust or thrust coefficient, sideslip, and normalized AOA.

The aircraft normalized AOA shall be calculated as follows:

$$\alpha_{norm} = \frac{(\alpha_{CF} - \{\alpha_0(\text{Flap, Mach})\})}{(\alpha_{SP} - \{\alpha_0(\text{Flap, Mach})\})}$$

where, $\alpha_0$=zero lift aircraft angle-of-attack as a function of flap position and Mach number, $\alpha_{CF}$=the AOA output from the complementary filter, and $\alpha_{SP}$=the aircraft AOA threshold for stick pusher activation. The controller provides scheduling capability with Mach and scheduled flap position by interpolating a lookup table (e.g., with four flap positions).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An aircraft angle-of-attack determining method, comprising:
providing an output signal from an angle-of-attack sensor to a controller;
providing a load factor component from the angle-of-attack sensor to the controller;
determining, via the controller, an initial angle-of-attack signal based on the output signal and the load factor component;
compensating, via the controller, the initial angle-of-attack signal to provide a pseudo angle-of-attack signal based on dynamic pressure;
mapping, via the controller, the pseudo angle-of-attack signal to a true angle-of-attack signal based on angle-of-attack flight test data,
wherein mapping the pseudo angle-of-attack signal is configured to remove nonlinear behavior of the pseudo angle-of-attack signal;
compensating, via the controller, the true angle-of-attack signal based on a measured aircraft roll rate and a measured aircraft sideslip to provide a compensated angle-of-attack; and
applying, via the controller, a complementary filter that passes the compensated angle-of-attack signal through a low-pass filter and complements it with higher frequency inertial angle-of-attack rate signal calculated from aircraft inertial data to provide an angle-of-attack complementary filter output.

2. The method of claim 1, further comprising determining, via the controller, an angle-of-attack threshold for aircraft stall protection based on one or more compensation parameters.

3. The method of claim 2, wherein the one or more compensation parameters include one or more of icing condition, flap position, landing gear position, Mach number, pressure altitude, inertial angle-of-attack rate, sideslip, engine shaft power/torque, thrust, pitch rate, axial deceleration, airspeed rate, filtered derivative of airspeed, and thrust coefficient, as well as any flight-test discovered dependencies or unexplained factors.

4. The method of claim 2, further comprising determining when the aircraft stall protection should activate based on the angle-of-attack threshold compared with the angle-of-attack complementary filter output.

5. The method of claim 3, wherein the step of determining the angle-of-attack threshold for aircraft stall protection includes determining a first angle-of-attack threshold for stick pusher activation based on adjustments for the one or more compensation parameters.

6. The method of claim 5, wherein the step of determining the angle-of-attack threshold for aircraft stall protection includes determining a second angle-of-attack threshold for stall warning activation based on the first angle-of-attack threshold plus an adjustment for stall warning activation.

7. The method of claim 1, wherein the angle-of-attack sensor is a lift transducer.

8. The method of claim 1, further comprising adjusting the output signal from the angle-of-attack sensor based on a load-factor component associated with aircraft maneuvering for determining the initial angle-of-attack signal.

9. The method of claim 1, wherein the step of compensating the initial angle-of-attack signal to provide a pseudo angle-of-attack signal is based on dynamic pressure.

10. The method of claim 1, wherein the step of mapping the pseudo angle-of-attack signal to a true angle-of-attack signal is based on one or more of flap position, shaft power, shaft torque, thrust, and thrust coefficient.

11. The method of claim 1, further comprising establishing a minimum airspeed cutoff to avoid singularities and angle-of-attack sensor inaccuracies caused by dividing by zero in data processing and scheduling implementation, such that when airspeed is below the minimum airspeed cutoff, stall warning and stick pusher activation is inactive.

12. A method for determining an aircraft angle-of-attack for aircraft stall protection, comprising:
providing an output signal from an angle-of-attack sensor to a controller;
determining a load factor component for the aircraft;
determining, via the controller, an initial angle-of-attack signal based on the output signal and the load factor component;

compensating, via the controller, the initial angle-of-attack signal to provide a pseudo angle-of-attack signal based on dynamic pressure;

mapping, via the controller, the pseudo angle-of-attack signal to a true angle-of-attack signal based on flight test data, wherein the flight test data is acquired using a calibrated wing-tip-mounted angle-of-attack boom;

compensating, via the controller, the true angle-of-attack signal based on both roll rate and sideslip to provide a compensated angle-of-attack;

applying a complementary filter, via the controller, that passes the compensated angle-of-attack signal through a low-pass filter and complements it with higher frequency inertial angle-of-attack rate signal calculated from aircraft inertial data to provide an angle-of-attack complementary filter output signal;

determining, via the controller, an angle-of-attack threshold for aircraft stall protection based on one or more parameters; and activating aircraft stall protection based on the complementary filter output signal compared with the angle-of-attack threshold.

13. The aircraft angle-of-attack determining method of claim 12, wherein the step of applying the complementary filter further comprises removing higher frequency effects of wind gusts and turbulence that are naturally damped out by aircraft inertia without adding a time delay.

14. The aircraft angle-of-attack determining method of claim 12, wherein the angle-of-attack threshold for aircraft stall protection may include an offset to compensate for the one or more parameters, the offset including a gain applied based on flight test data, including a nonlinear scheduling capability, by interpolating a lookup table.

15. The aircraft angle-of-attack determining method of claim 12, wherein the one or more parameters include one or more of icing condition, flap position, landing gear position, Mach number, pressure altitude, inertial angle-of-attack rate, sideslip, engine shaft power/torque, thrust, thrust coefficient, flight-test discovered dependencies, pitch rate, axial deceleration, airspeed rate, filtered derivative of airspeed, and unexplained factors.

16. The aircraft angle-of-attack determining method of claim 15, wherein the following parameters are a function of flap position: icing, landing gear position, angle-of-attack rate, pitch rate, engine shaft torque, shaft power, thrust, thrust coefficient, sideslip, and normalized angle-of-attack.

17. The aircraft angle-of-attack determining method of claim 13, wherein the flight-test discovered dependencies may include a computed correction to compensate for unknown effects on angle-of-attack that may be encountered during flight test development.

* * * * *